United States Patent [19]

Dahle et al.

[11] 3,718,452

[45] Feb. 27, 1973

[54] COMBATING UNWANTED VEGETATION WITH 2-ARYL-5-SUBSTITUTED 1,3,4-OXADIAZOLES

[75] Inventors: Norman A. Dahle, Mission; William C. Doyle, Jr., Leawood, both of Kans.

[73] Assignee: Gulf Research & Development Company, Pittsburgh, Pa.

[22] Filed: Oct. 24, 1969

[21] Appl. No.: 869,369

[52] U.S. Cl. ................................. 71/92, 260/307 G
[51] Int. Cl. ............................................. A01n 9/22
[58] Field of Search ........................................ 71/92

[56] References Cited

UNITED STATES PATENTS

| | | | |
|---|---|---|---|
| 3,203,959 | 8/1965 | Hoffman | 71/92 X |
| 3,564,606 | 2/1971 | Breuer | 71/92 X |

FOREIGN PATENTS OR APPLICATIONS

| | | | |
|---|---|---|---|
| 1,063,799 | 3/1967 | Great Britain | 71/92 |
| 4,520,519 | 7/1970 | Japan | 71/92 |

Primary Examiner—James O. Thomas, Jr.
Attorney—Richard L. Kelly, Carl A. Cline and Forrest D. Stine

[57] ABSTRACT

Unwanted vegetation is combated by application of a class of phenyloxadiazoles which possess either or both pre and post-emergent phytotoxicity. The herbicides as a class are severely toxic to a minority of plant species, most of the compounds having pre-emergent effectiveness against crabgrass. Some of the compounds, as for example, 2-(3',4'-dichlorophenyl)-5-methyl-1,3,4-oxadiazole, are particularly useful for pre-emergent control of weeds in a standing crop because of an almost total absence of post-emergent phytotoxicity.

A small group of compounds, such as 2-dimethylamino-5-(2',4'-dimethylphenyl)-1,3,4-oxadiazole are predominantly post-emergent herbicides and a number of compounds, as for instance, 2-diethylamino-5-p-tolyl-1,3,4-oxadiazole, have both pre- and post-emergent activity and are useful in combating both crabgrass and broadleaf weeds in fields of small grains and in brome grass pastures.

23 Claims, No Drawings

COMBATING UNWANTED VEGETATION WITH 2-ARYL-5-SUBSTITUTED 1,3,4-OXADIAZOLES

DESCRIPTION OF THE INVENTION

Selective herbicides which are effective to combat only a few particularly troublesome species or which may be used to combat several species in the presence of a particularly valuable crop are scarce and much-desired chemical products.

The herbicides of the present invention belong to a class of 2-phenyl-1,3,4-oxadiazoles having the structural formula

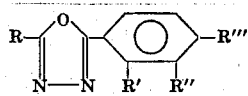

in which R is selected from the group consisting of hydrogen, mercapto, thiocyano, amino, lower alkylamino, di(lower alkyl)amino, methyl, cyclopropyl, ethyl and propyl; R' is selected from the group consisting of hydrogen, chloro and methyl; R'' is selected from the group consisting of hydrogen, chloro, nitro, bromo, iodo and methyl and R''' is selected from the group consisting of hydrogen, methyl, chloro, bromo and fluoro substituents. These substances are generally phytotoxic to less than half of a group of test species representing about fifteen plant families. By virtue of this selective behavior they are useful for combating unwanted vegetation in the presence of seeds and living plants of other species.

The preparation and use of the novel herbicides are discussed below.

SYNTHESIS OF THE HERBICIDES

The starting materials for most of the compounds employed as selective herbicides are aromatic acid hydrazides and the synthesis methods are summarized on the following flow sheet, Scheme A. Some of the compounds are also conveniently prepared from aryl tetrazoles, using the reactions shown in Scheme B.

SCHEME A

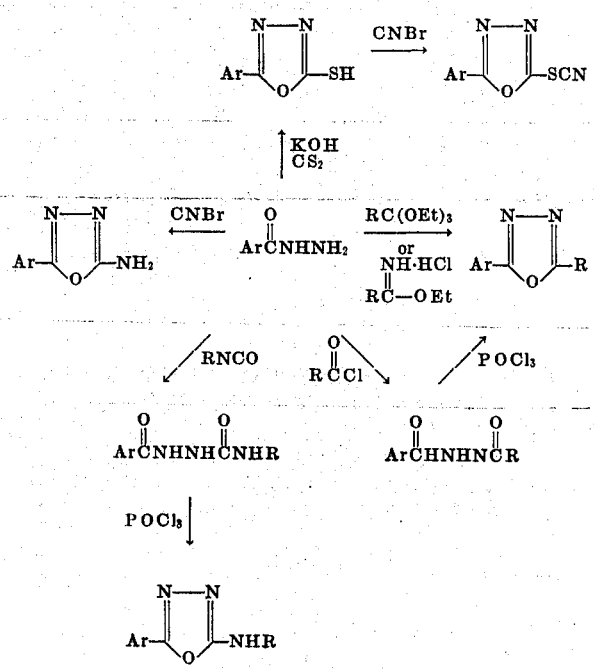

SCHEME B

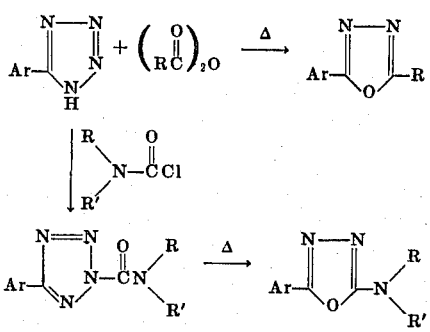

Illustration of Scheme A

The individual methods shown in Scheme A are specifically exemplified below for illustrative purposes.

Method 1

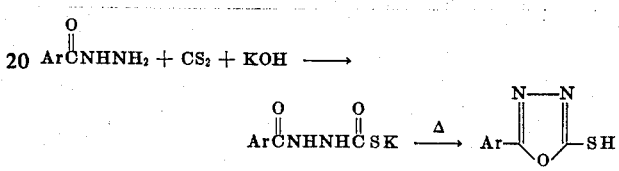

Preparation of 2-mercapto-5-(p-chlorophenyl)-1,3,4-oxadiazole

To a stirred solution of 20 g p-chlorobenzhydrazide and 7.6 g potassium hydroxide in 200 ml 95 percent ethanol and 30 ml $H_2O$ is added slowly 11.7 g carbon disulfide. The resultant slurry is refluxed until $H_2S$ evolution ceases (4–6 hrs.), and the solvent is removed under reduced pressure. The residue is poured onto 200 g of ice and 30 ml of concentrated HCl and the precipitated product is collected and recrystallized from ethanol, giving 14.2 g of 2-mercapto-5-(p-chlorophenyl)-1,3,4-oxadiazole, m.p. 176°–8°.

Method 2

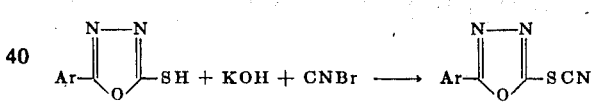

Preparation of 2-thiocyano-5-(p-fluoro-phenyl)-1,3,4-oxadiazole

To a stirred solution of 4.1 g 2-mercapto-5-(p-fluorophenyl)-1,3,4-oxadiazole and 1.2 g potassium hydroxide in 50 ml of methanol is added 2.2 g of solid cyanogen bromide. The solution is stirred an additional half hour, diluted with water and the precipitate is filtered and washed with water, giving 3.5 g of 2-thiocyano-5-(p-fluorophenyl)-1,3,4-oxadiazole, m.p. 91°–6°.

Method 3

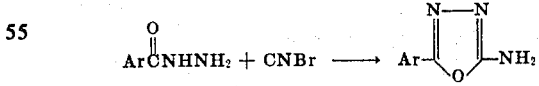

Preparation of 2-amino-5-phenyl-1,3,4-oxadiazole

Benzhydrazide (70.2 g) is added to a solution of 54.1 g of cyanogen bromide in 1000 ml of methanol at a rate such that the temperature does not rise above 40°. The solution is then stirred one-half hour at 40°, refluxed one and one half hours, filtered hot, boiled down to about 500 ml and neutralized with dilute $NH_4OH$. The resultant precipitate is collected and recrystallized from ethanol, giving 54 g of 2-amino-5-phenyl-1,3,4-oxadiazole, m.p. 234°–5°.

Method 4

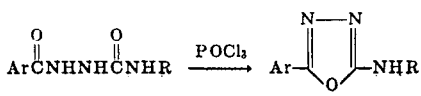

Preparation of 2-propylamino-5-(m-chloro-phenyl)-1,3,4-oxadiazole

A mixture of 16.7 g 1-(m-chlorobenzoyl)-4-propyl-semicarbazide and 120 ml of phosphorus oxychloride is refluxed 2 hrs. Most of the solvent is distilled at reduced pressure and the residue is poured onto ice. Neutralization with concentrated NH₄OH gives 11.3 g of crude solid, recrystallization of which from ethylene dichloride-hexane gives 4.0 g of 2-n-propylamino-5-(m-chlorophenyl)-1,3,4-oxadiazole, m.p. 122.5–123.0°

Method 5

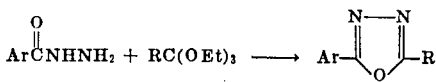

Preparation of 2-(3',4'-dichlorophenyl)-5-methyl-1,3,4-oxadiazole

A mixture of 10 g 3,4-dichlorobenzhydrazide and 65 ml triethyl orthoacetate is refluxed 18 hours. Forty milliliters of solvent is then removed by distillation at atmospheric pressure. The residue is cooled to 90°, 75 ml of hexane is added, and on further cooling, 10.5 g of 2-(3',4'-dichlorophenyl)-5-methyl-1,3,4-oxadiazole, m.p. 147°–9° crystallizes.

Method 6

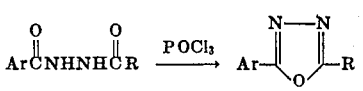

Preparation of 2-cyclopropyl-5-(m-bromo-phenyl)-1,3,4-oxadiazole

A mixture of 8.7 g of N-(m-bromobenzoyl)-N'-cyclopropanecarbonylhydrazine and 100 ml of phosphorus oxychloride is heated 1½ hours at 85°–90°. The solution is concentrated to about 50 ml by distillation at reduced pressure and the residue is poured onto ice, precipitating 7.1 g of 2-cyclopropyl-5-(m-bromophenyl)-1,3,4-oxadiazole, m.p. 78°–80.5°.

Method 7

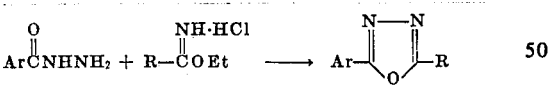

Preparation of 2-ethyl-5-(m-chlorophenyl)1,3,4-oxadiazole

To a solution of 17.0 g of m-chlorobenzhydrazide in 50 ml of ethanol is added slowly a solution of 13.7 g of ethyl propionimidate hydrochloride in 40 ml of ethanol and the mixture is warmed one hour on the steam bath, boiled down and allowed to crystallize, giving 5.9 g of 2-ethyl-5-(m-chlorophenyl)-1,3,4-oxadiazole, m.p. 55°–7.

Method 8

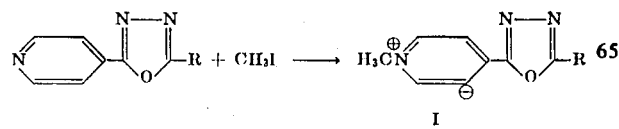

Preparation of 1-methyl-4-(1,3,4-oxa-diazol-2-yl)-pyridinium iodide

A solution of 5 g of 2-(4-pyridyl)-1,3,4-oxadiazole and 7.3 g of methyl iodide in 30 ml of N,N-dimethyl formamide is stirred 4 hours at room temperature, then diluted with anhydrous diethyl ether, precipitating 9.3 g of 1-methyl-4-(1,3,4-oxadiazol-2-yl)-pyridinium iodide, m.p. 208°–10°.

Illustration of Scheme B

The aryltetrazoles employed as starting materials in Scheme B may be prepared by the method of W. G. Finnegan, R. A. Henry and R. L. Lofquist (J. Am. Chem. Soc., 80, 3908 (1958) and U.S. Pat. 2,977,372) which utilizes the reaction of an arylnitrile with a mixture of ammonium chloride and sodium azide in dimethylformamide containing a catalytic amount of lithium chloride.

Method 9

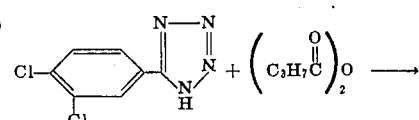

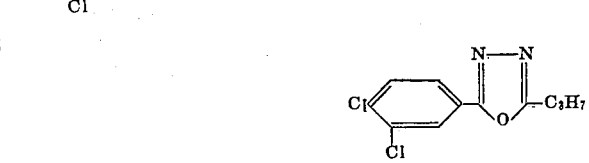

Preparation of 2-n-propyl-5-(3',4'-dichloro-phenyl)-1,3,4-oxadiazole

A solution of 5.0 g of 5-(3,4-dichlorophenyl)-tetrazole in 50 ml of butyric anhydride containing 10 drops of pyridine is refluxed 18 hours. Most of the excess anhydride is distilled at reduced pressure and the residue is crystallized from hexane, giving 3.0 g of 2-n-propyl-5-(3',4'-dichlorophenyl)-1,3,4-oxadiazole, m.p. 80–82°.

Method 10

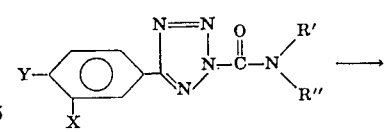

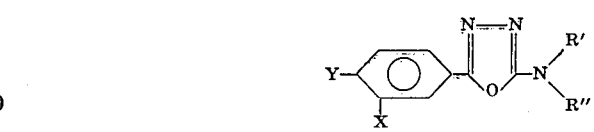

The 2-dialkylamino-5-aryl-1,3,4-oxadiazoles may be prepared from 2-dialkylcarbamyl-5-aryl tetrazoles. The required tetrazole intermediates are prepared by reacting an aryltetrazole with a dialkyl-carbamyl chloride according to the following general procedure.

Preparation of 5-aryl-2-dialkyl-carbamyl-2H-tetrazoles

To a stirred solution of the appropriate tetrazole dissolved in a minimum volume of pyridine is added dropwise the dialkylcarbamyl chloride. Keeping the temperature below 30° by cooling the reaction flask in an ice-bath, the reaction mixture, after standing for a substantial period of time, as for example overnight, is cooled in the ice-bath and diluted with water. The insoluble material is collected by vacuum filtration and allowed to dry in air. The crude product may be purified by dissolving it in ethyl acetate, at room temperature, filtering the resulting solution and precipitating the product with hexane. The nuclear magnetic resonance spectrum of the product shows a characteristic broad peak for the hydrogen atoms attached to the carbon atom adjacent to the carboxamide nitrogen. The infrared spectrum of the product exhibits a peak at about 5.8 millimicrons.

Preparation of 2-aryl-5-dialkyl-amino-1,3,4-oxadiazoles

The following is a description of a general laboratory scale procedure for converting the dialkylcarbamyl tetrazoles to the desired dialkylamino oxadiazoles. The crude product resulting from the treatment of a tetrazole with a dialkylcarbamyl chloride is placed in a test tube (30 × 7.5 cm) equipped with a magnetic stirrer and immersed in an oil bath. The temperature is slowly increased until the solid has melted. If the melting point of the starting material is over 100° the bath temperature is held at about 80° for 1-2 hours prior to increasing the temperature to the melting point. The temperature of the oil bath is then slowly raised to 120°-130°C and maintained until the evolution of nitrogen ceases. The tube and its contents are allowed to cool to room temperature and the resulting product is purified by distillation or recrystallization from a suitable solvent.

Hydrochlorides and other mineral acid salts of the dialkylamino substituent groups on the oxadiazole products are readily prepared by conventional methods. The selectivity of phytotoxicity of the salts is very similar to that of the parent amino-substituted compounds.

USE OF THE HERBICIDES

So as to illustrate clearly selective phytotoxic properties of the herbicides, a group of controlled greenhouse experiments is described below.

1. Post Emergent Use

An aqueous dispersion of each active compound was prepared by combining 0.4 gram of the compound with about 4 ml of a solvent-emulsifier mixture (three parts of a commercial polyoxyethylated vegetable oil emulsifier, one part xylene, one part kerosene) and then adding water, with stirring, to a final volume of 40 ml.

The species of plants on which each compound was to be tested were planted in 4-inch pots in a greenhouse. Ten to 18 days after emergence of the plants, three pots were sprayed with an aqueous dispersion of the active compound prepared as described above, at a rate of 5 lb. of active compound per acre and at a spray volume of 60 gallons per acre. Approximately 1 week after the spray application the plants were observed and the results rated according to the following schedule:

0 = no effect
1 = slight effect
2 = moderate effect
3 = severe effect
4 = maximum effect (all plants died)

The same rating schedule was employed to judge pre-emergent results obtained according to the procedure below.

2. Pre-Emergent Use

A solution of each active compound was prepared by dissolving 290 mg. of the compound to be tested in 200 ml. of acetone. Disposable paper trays about 2 inches deep and half the size of ordinary greenhouse flats were prepared and seeded with a variety of species of plant seeds, then sprayed with the acetone solution at the rate of 10 lb. of active chemical per acre of sprayed area. One tray, which had been seeded with alfalfa, brome, flax, oats, radishes and sugar beets was held at 75°F. day temperature; another seeded with corn, coxcomb, cotton, crabgrass, millet and soybeans was held at 85°F. Twenty-one days after seeding and treatment the planted trays were examined and herbicidal effect was rated according to the above schedule.

Both post-emergent and pre-emergent results are set forth in the following tables. The compounds are grouped in the tables according to general characteristics as pre- or post-emergent herbicides. Those with predominantly pre-emergent activity are useful particularly in combating crabgrass. The post-emergent herbicides are useful in combating various weeds in grain crops. The compounds with both pre- and post-emergent activity are useful in combating crabgrass and broadleaf weeds in small grains, soybeans and in brome grass pastures. The data in the tables will aid the worker in the field of weed control in selecting herbicides for use in specific weed control situations. By "weed" is meant broadly unwanted or undesired vegetation, which in some instances may include crop species that are in an undesirable location.

Table I 1,3,4-Oxadiazoles With Predominantly Pre-Emergent Herbicidal Activity

| Substituents | Synthesis method | Melting point (°C.) or boiling point (°C./mm. Hg) | Activity type | Crab-grass | Cox-comb | Brome | Millet | Soy-bean | Cotton | Alfalfa | Oats | Corn | Flax | Radish | Sugar beet | Wheat | Grain sorghum | Tomato |
|---|---|---|---|---|---|---|---|---|---|---|---|---|---|---|---|---|---|---|
| 2-(3'-chlorophenyl)- | 5 | 82.5-83° | Pre | 4 | 2 | 1 | 4 | 3 | 1 | 4 | 3 | 3 | 4 | 4 | 4 | — | — | 0 |
| | | | Post | | | | 0 | 0 | 0 | 0 | 0 | 0 | 0 | 0 | 0 | 0 | 0 | 0 |
| 2-(3'-bromophenyl)- | 5 | 78-80.5° | Pre | 4 | 3 | 1 | 4 | 1 | 1 | 4 | 2 | 1 | 4 | 3 | 3 | 0 | 0 | 0 |
| | | | Post | | | | 1 | 2 | 2 | 1 | 0 | 2 | 0 | 1 | 2 | 0 | 0 | 2 |
| 2-(4'-bromophenyl)- | 5 | 150-1° | Pre | 4 | 3 | 1 | 3 | 1 | 0 | 4 | 1 | 1 | 3 | 3 | 3 | 0 | 0 | 0 |
| | | | Post | | | | 0 | 1 | 0 | 1 | 0 | 2 | 0 | 1 | 0 | 0 | 0 | 0 |
| 2-(3'-chlorophenyl)-5-amino- | 3 | 228-30° | Pre | 4 | 1 | 1 | 2 | 1 | 1 | 1 | 1 | 2 | 2 | 0 | 0 | 0 | 0 | 0 |
| | | | Post | | | | 0 | 1 | 0 | 0 | 0 | 0 | 0 | 0 | 1 | 0 | 0 | 1 |
| 2-(3'-chlorophenyl)-5-propylamino- | 4 | 122.5-123° | Pre | 4 | 1 | 1 | 1 | 1 | 1 | 0 | 0 | 0 | 1 | 0 | 0 | 0 | 0 | 2 |
| | | | Post | | | | 1 | 1 | 1 | 1 | 1 | 0 | 1 | 1 | 1 | 1 | 1 | 1 |
| 2-(3'-chlorophenyl)-5-methyl- | 9 | 71-2° | Pre | 4 | 4 | 2 | 4 | 1 | 0 | 4 | 2 | 3 | 4 | 4 | 4 | 2 | 0 | 1 |
| | | | Post | | | | 1 | 1 | 0 | 1 | 0 | 2 | 2 | 3 | 2 | 0 | 0 | 1 |
| 2-(3'-chlorophenyl)-5-propyl- | 9 | 35-6° | Pre | 4 | 4 | 3 | 4 | 1 | 0 | 4 | 4 | 2 | 4 | 4 | 3 | 0 | 0 | 1 |
| | | | Post | | | | 1 | 1 | 1 | 2 | 4 | 0 | 3 | 3 | 3 | 0 | 0 | 1 |
| 2-(3'-bromophenyl)-5-methyl- | 5 | 79-81° | Pre | 4 | 3 | 2 | 4 | 3 | 1 | 4 | 4 | 4 | 3 | 4 | 4 | 1 | 0 | 1 |
| | | | Post | | | | 0 | 2 | 0 | 0 | 1 | 0 | 1 | 1 | 1 | 0 | 0 | 0 |
| 2-(3',4'-dichlorophenyl)-5-methyl- | 5 | 147-9° | Pre | 4 | 4 | 2 | 4 | 2 | 1 | 3 | 4 | 4 | 3 | 4 | 4 | 0 | 0 | 0 |
| | | | Post | | | | 0 | 0 | 0 | 0 | 0 | 0 | 0 | 0 | 0 | 0 | 0 | 0 |
| 2-(3'-bromophenyl)-5-cyclopropyl- | 6 | 78-80.5° | Pre | 4 | 3 | 2 | 4 | 2 | 2 | 3 | 1 | 1 | 3 | 3 | 2 | 0 | 0 | 2 |
| | | | Post | | | | 2 | 0 | 0 | 1 | 1 | 2 | 1 | 1 | 1 | 0 | 0 | 2 |
| 2-(3',4'-dichlorophenyl)-5-ethyl- | 5 | 73-5° | Pre | 4 | 1 | 2 | 4 | 0 | 1 | 3 | 0 | 1 | 1 | 1 | 1 | 0 | 1 | 2 |
| | | | Post | | | | 0 | 1 | 0 | 1 | 0 | 0 | 1 | 1 | 1 | 0 | 0 | 0 |
| 2-(3',4'-dichlorophenyl)-5-propyl- | 9 | 80-2° | Pre | 4 | 4 | 2 | 4 | 2 | 0 | 2 | 2 | 0 | 0 | 0 | 3 | 0 | 1 | 0 |
| | | | Post | | | | 2 | 2 | 1 | 2 | 3 | 1 | 0 | 0 | 2 | 0 | 1 | 3 |
| 2-(4'-chlorophenyl)-5-ethyl- | 5 | 94-6° | Pre | 4 | 1 | 1 | 0 | 1 | 0 | 1 | 1 | 1 | 0 | 1 | 3 | 0 | 1 | 3 |
| | | | Post | | | | 1 | 0 | 1 | 1 | 3 | 1 | 3 | 4 | 2 | 0 | 0 | 3 |
| 2-(m-tolyl)-5-methyl- | 5 | 68-9° | Pre | 4 | 3 | 1 | 3 | 0 | 0 | 1 | 2 | 0 | 1 | 1 | 3 | 0 | 1 | 3 |
| | | | Post | | | | 0 | 0 | 0 | 1 | 3 | 1 | 2 | 1 | 1 | 0 | 0 | 3 |
| 2-(m-tolyl)- | 5 | 47-50° | Pre | 4 | 1 | 1 | 0 | 0 | 0 | 1 | 1 | 1 | 1 | 1 | 1 | 0 | 0 | 3 |
| | | | Post | | | | 2 | 1 | 0 | 1 | 2 | 1 | 2 | 2 | 1 | 1 | 1 | 3 |
| 2-(3',4'-dichlorophenyl)-5-butyl- | 9 | 53-5° | Pre | 4 | 0 | 2 | 4 | 1 | 0 | 0 | 0 | 2 | 0 | 0 | 2 | 1 | 1 | 2 |
| | | | Post | | | | 2 | 1 | 0 | 2 | 2 | 2 | 2 | 2 | 2 | 1 | 0 | 2 |
| 2-(3'-iodophenyl)-5-methyl- | 5 | 117-18° | Pre | 4 | 2 | 1 | 4 | 1 | 0 | 2 | 1 | 0 | 2 | 0 | 1 | 1 | 1 | 2 |
| | | | Post | | | | 1 | 0 | 1 | 2 | 2 | 1 | 2 | 1 | 1 | 1 | 1 | 1 |
| 2-(4'-bromophenyl)-5-methyl- | 5 | 117-20° | Pre | 4 | 0 | 0 | 3 | 3 | 3 | 3 | 3 | 2 | 3 | 3 | 3 | 1 | 1 | 3 |
| | | | Post | | | | 0 | 1 | 1 | 2 | 1 | 0 | 0 | 0 | 0 | 1 | 1 | 2 |
| 2-amino-5-phenyl- | 3 | 234-5° | Pre | 4 | 2 | 1 | 0 | 0 | 1 | 2 | 1 | 0 | 1 | 0 | 0 | 0 | 0 | 1 |
| | | | Post | | | | 0 | 0 | 1 | 3 | 1 | 0 | 0 | 1 | 1 | 0 | 0 | 1 |
| 2-(3'-chlorophenyl)-5-cyclopropyl- | 6 | 74-76° | Pre | 4 | 2 | 2 | 0 | 1 | 1 | 1 | 0 | 0 | 0 | 1 | 1 | 0 | 0 | 1 |
| | | | Post | | | | 1 | 0 | 0 | 1 | 1 | 1 | 1 | 1 | 0 | 0 | 0 | 0 |
| 2-(3',4'-dichlorophenyl)-5-diethylamino- | 10 | 114-115° | Pre | 4 | 2 | 0 | 1 | 0 | 0 | 0 | 0 | 1 | 0 | 0 | 1 | 1 | 0 | 1 |
| | | | Post | | | | 1 | 1 | 1 | 1 | 1 | 0 | 1 | 0 | 0 | 0 | 0 | 0 |
| 2-(3',4'-dichlorophenyl)-5-dimethylamino- | 10 | 130-2° | Pre | 4 | 1 | 1 | 1 | 0 | 1 | 1 | 0 | 0 | 1 | 0 | 0 | 1 | 1 | 3 |
| | | | Post | | | | 1 | 2 | 1 | 1 | 1 | 0 | 1 | 2 | 3 | 1 | 1 | 3 |

Table II 1,3,4-Oxadiazoles With Predominantly Post-Emergent Herbicidal Activity

| Substituents | Synthesis method | Melting point (°C.) or boiling point (°C./mm. Hg) | Activity type | Crab-grass | Cox-comb | Brome | Millet | Soy-bean | Cotton | Alfalfa | Oats | Corn | Flax | Radish | Sugar beet | Wheat | Grain sorghum | Tomato |
|---|---|---|---|---|---|---|---|---|---|---|---|---|---|---|---|---|---|---|
| 2-(3'-nitrophenyl)-5-mercapto- | 1 | 209–210.5° | Pre. / Post. | 0 | 0 | 0 | 0 / 4 | 0 / 3 | 0 / 4 | 0 / 3 | 0 / 2 | 0 / 3 | 0 / 4 | 0 / 3 | 0 / 4 | — / 3 | — / 3 | — / 3 |
| 2-(3'-nitrophenyl)- | 5 | 127–128.5° | Pre. / Post. | 1 | 1 | 0 | 2 / 1 | 3 / 2 | 4 / 0 | 3 / 1 | 2 / 0 | 3 / 0 | 4 / 0 | 3 / 0 | 4 / 0 | — / 3 | — / 3 | — / 4 |
| 2-(4'-chlorophenyl)-5-mercapto- | 1 | 176–178° | Pre. / Post. | 3 | 0 | 0 | 2 / 1 | 2 / 0 | 3 / 0 | 4 / 0 | 2 / 1 | 2 / 1 | 3 / 0 | 2 / 0 | 3 / 0 | — / 2 | — / 3 | — / 4 |
| 2-(3'-chlorophenyl)-5-mercapto- | 1 | 101–3° | Pre. / Post. | 2 | 0 | 0 | 3 / 1 | 0 / 1 | 0 / 4 | 0 / 4 | 1 / 1 | 1 / 1 | 1 / 1 | 1 / 0 | 0 / 4 | — / 1 | — / 1 | — / 4 |
| 2-(4'-fluorophenyl)-5-mercapto- | 2 | 91–96° | Pre. / Post. | 1 | 0 | 0 | 1 / 1 | 2 / 0 | 2 / 0 | 4 / 0 | 0 / 1 | 1 / 0 | 1 / 0 | 1 / 1 | 0 / 4 | — / 1 | — / 0 | — / 4 |
| 2-(4'-fluorophenyl)-5-thiocyano- | 10 | 118–20°/0.05 mm. | Pre. / Post. | 1 | 0 | 0 | 0 / 2 | 2 / 0 | 2 / 0 | 4 / 0 | 0 / 1 | 0 / 1 | 0 / 1 | 0 / 1 | 0 / 4 | — / 1 | — / 1 | — / 4 |
| 2-diethylamino-5-phenyl- | 10 | 140–41° | Pre. / Post. | 3 | 2 | 0 | 4 / 1 | 4 / 2 | 4 / 2 | 4 / 1 | 0 / 3 | 0 / 2 | 3 / 0 | 3 / 0 | 3 / 3 | — / 3 | — / 3 | — / 4 |
| 2-(4'-chlorophenyl)-5-dimethylamino- | 10 | 146–8°/0.05 mm. | Pre. / Post. | 3 | 4 | 1 | 0 / 3 | 3 / 1 | 0 / 4 | 4 / 1 | 3 / 1 | 0 / 2 | 2 / 0 | 2 / 0 | 0 / 3 | — / 2 | — / 2 | — / 4 |
| 2-(2',4'-dichlorophenyl)-5-diethylamino- | 1 | 208–9° | Pre. / Post. | 0 | 0 | 0 | 0 / 2 | 0 / 1 | 0 / 4 | 0 / 3 | 3 / 0 | 3 / 0 | 3 / 0 | 3 / 0 | 0 / 4 | — / 4 | — / 2 | — / 4 |
| 2-(4'-fluorophenyl)-5-mercapto- | 10 | 73–4° | Pre. / Post. | 0 | 3 | 0 | 0 / 4 | 0 / 1 | 0 / 4 | 0 / 3 | 0 / 1 | 0 / 1 | 0 / 1 | 0 / 1 | 0 / 4 | — / 1 | — / 1 | — / 1 |
| 2-dimethylamino-5-p-tolyl- | 10 | 102–4° | Pre. / Post. | 0 | 0 | 0 | 2 / 4 | 2 / 2 | 2 / 0 | 3 / 2 | 0 / 2 | 0 / 2 | 0 / 4 | 1 / 4 | 3 / 4 | — / 3 | — / 2 | — / 3 |
| 2-dimethylamino-5-(2',4'-dimethylphenyl)- | 10 | 158–60°/0.5 mm. | Pre. / Post. | 0 | 0 | 0 | 1 / 4 | 4 / 0 | 3 / 0 | 4 / 3 | 4 / 3 | 0 / 1 | 0 / 4 | 0 / 3 | 4 / 3 | — / 3 | — / 3 | — / 4 |
| 2-diethylamino-5-(2',4'-dimethylphenyl)- | 10 | 141–3° | Pre. / Post. | 0 | 2 | 0 | 0 / 4 | 0 / 1 | 0 / 2 | 0 / 4 | 0 / 3 | 0 / 2 | 0 / 3 | 0 / 4 | 2 / 4 | — / 3 | — / 3 | — / 4 |
| 2-diethylamino-5-(2'4'-dimethylphenyl)-(hydrochloride)- | 10 | 101–3° | Pre. / Post. | 0 | 0 | 0 | 0 / 1 | 0 / 2 | 0 / 2 | 1 / 4 | 0 / 1 | 0 / 1 | 0 / 2 | 0 / 4 | 2 / 4 | — / 3 | — / 2 | — / 3 |
| 2-dimethylamino-5-(4'-fluorophenyl)- | 1 | 195–196.5° | Pre. / Post. | 1 | 1 | 0 | 0 / 3 | 0 / 3 | 0 / 4 | 0 / 3 | 0 / 1 | 0 / 4 | 0 / 3 | 0 / 3 | 0 / 4 | — / 1 | — / 1 | — / 4 |
| 2-(4'-bromophenyl)-5-mercapto- | | | | | | | | | | | | | | | | | | |

Table III 1,3,4-Oxadiazoles With Predominantly Pre-Emergent Herbicidal Activity

| Substituents | Synthesis method | Melting point (°C.) or boiling point (°C./mm. Hg) | Activity type | Crab-grass | Cox-comb | Brome | Millet | Soy-bean | Cotton | Alfalfa | Oats | Corn | Flax | Radish | Sugar beet | Wheat | Grain sor-ghum | Tomato |
|---|---|---|---|---|---|---|---|---|---|---|---|---|---|---|---|---|---|---|
| 2-(3',4'-dichlorophenyl)-5-mercapto- | 1 | 190.5–192° | Pre. | 4 | 3 | 1 | 4 | 1 | 0 | 2 | 2 | 1 | 3 | 1 | 2 | -- | -- | 4 |
| | | | Post. | -- | -- | -- | 1 | 2 | 0 | 4 | 0 | 1 | 3 | 4 | 4 | 1 | 1 | 4 |
| 2-(3',4'-dichlorophenyl)- | 5 | 106–8° | Pre. | 4 | 4 | 2 | 4 | 3 | 2 | 4 | 3 | 2 | 4 | 4 | 4 | 1 | 0 | 4 |
| | | | Post. | 4 | 1 | 1 | 1 | 1 | 0 | 3 | 1 | 0 | 2 | 1 | 1 | 0 | 0 | 4 |
| 2-(4'-chlorophenyl)-5-methyl- | 5 | 97–9° | Pre. | 4 | 4 | 1 | 4 | 2 | 1 | 4 | 1 | 4 | 3 | 3 | 4 | 1 | 0 | 4 |
| | | | Post. | 4 | 1 | 1 | 1 | 1 | 0 | 3 | 1 | 2 | 1 | 1 | 1 | 0 | 2 | 4 |
| 2-(3'-iodophenyl)- | 5 | 84–6° | Pre. | 4 | 4 | 1 | 4 | 0 | 0 | 4 | 1 | 1 | 4 | 0 | 3 | 1 | 2 | 4 |
| | | | Post. | 4 | 0 | -- | 2 | 1 | 0 | 3 | 1 | 1 | 2 | 3 | 1 | 3 | 2 | 4 |
| 2-(3'-chloro-p-tolyl)-5-methyl- | 9 | 78–80° | Pre. | 4 | 4 | 1 | 4 | 1 | 0 | 4 | 1 | 0 | 3 | 3 | 4 | 0 | 1 | 4 |
| | | | Post. | 4 | 0 | 1 | 2 | 1 | 0 | 2 | 1 | 0 | 1 | 1 | 1 | 1 | 1 | 3 |
| 2-dimethylamino-5-phenyl- | 10 | 84–6° | Pre. | 2 | 2 | 1 | 1 | 1 | 0 | 4 | 1 | 0 | 4 | 3 | 4 | 2 | 1 | 4 |
| | | | Post. | 4 | 4 | 0 | 3 | 0 | 2 | 4 | 3 | 2 | 0 | 0 | 2 | 1 | 2 | 3 |
| 2-(2'-chlorophenyl)-5-dimethylamino- | 10 | 70–72° | Pre. | 4 | 2 | 1 | 1 | 2 | 1 | 4 | 0 | 1 | 2 | 1 | 4 | 1 | 2 | 4 |
| | | | Post. | 1 | 4 | 0 | 3 | 1 | 0 | 3 | 3 | 0 | 1 | 2 | 4 | 2 | 1 | 4 |
| 2-(2'-chlorophenyl)-5-diethylamino- | 10 | 150–56°/0.1 mm. | Pre. | 2 | 4 | 1 | 1 | 1 | 0 | 4 | 0 | 0 | 0 | 1 | 4 | 2 | 1 | 4 |
| | | | Post. | -- | -- | 0 | 0 | 0 | 2 | 4 | 1 | 2 | 1 | 2 | 4 | 2 | 2 | 4 |
| 2-(2'-chlorophenyl)-5-diethylaminohydrochloride | 10 | 167–70° | Pre. | 2 | 4 | -- | 2 | 0 | 0 | 3 | 1 | 0 | 0 | 1 | 4 | 2 | 1 | 4 |
| | | | Post. | 4 | 4 | -- | 3 | 1 | 2 | 4 | 1 | 1 | 4 | 3 | 4 | 4 | 2 | 4 |
| 2-(4'-chlorophenyl)-5-diethylamino- | 10 | 92–3° | Pre. | 4 | 4 | -- | 3 | 1 | 4 | 4 | 1 | 4 | 2 | 4 | 4 | 4 | 2 | 4 |
| | | | Post. | 4 | 4 | 1 | 1 | 1 | 0 | 2 | 1 | 0 | 1 | 1 | 4 | 2 | 1 | 4 |
| 2-(4'-chlorophenyl)-5-diethylaminohydrochloride | 10 | 125–9° | Pre. | 4 | 4 | 1 | 3 | 0 | 2 | 4 | 0 | 1 | 1 | 3 | 4 | 2 | 1 | 4 |
| | | | Post. | 4 | 4 | 1 | 2 | 1 | 2 | 4 | 3 | 3 | 0 | 0 | 4 | 4 | 1 | 4 |
| 2-diethylamino-5-o-tolyl- | 10 | 124–30°/0.1 mm. | Pre. | 4 | 4 | 1 | 1 | 0 | 2 | 4 | 2 | 1 | 2 | 2 | 4 | 4 | 1 | 4 |
| | | | Post. | -- | -- | -- | 2 | 1 | 0 | 3 | 0 | 0 | 0 | 4 | 4 | 4 | 1 | 4 |
| 2-diethylamino-5-o-tolyl-hydrochloride | 10 | 137–42° | Pre. | 4 | 4 | 1 | 3 | 1 | 0 | 4 | 2 | 1 | 1 | 4 | 4 | 4 | 1 | 4 |
| | | | Post. | -- | -- | -- | 4 | 0 | 3 | 3 | 0 | 0 | 0 | 1 | 3 | 4 | 1 | 4 |
| 2-dimethylamino-5-o-tolyl- | 10 | 57–8° | Pre. | 4 | 4 | 1 | 2 | 1 | 0 | 4 | 2 | 1 | 1 | 1 | 3 | 2 | 3 | 4 |
| | | | Post. | -- | -- | -- | 3 | 0 | 2 | 3 | 0 | 0 | 0 | 0 | 4 | 4 | 3 | 4 |
| 2-diethylamino-5-p-tolyl- | 10 | 54–6° | Pre. | 4 | 4 | 1 | 4 | 2 | 0 | 4 | 2 | 2 | 4 | 4 | 4 | 4 | 3 | 4 |
| | | | Post. | -- | -- | -- | 4 | 2 | 4 | 4 | 1 | 1 | 3 | 4 | 4 | 4 | 3 | 4 |
| 2-diethylamino-5-(4'-fluorophenyl)- | 10 | 128–32°/0.2 mm. | Pre. | 4 | 4 | 1 | 4 | 2 | 2 | 4 | 1 | 1 | 3 | 4 | 4 | 2 | 1 | 4 |
| | | | Post. | -- | -- | -- | 4 | 0 | 0 | 4 | 3 | 1 | 1 | 3 | 4 | 0 | 2 | 4 |
| 2-(3'-chlorophenyl)-5-ethyl- | 7 | 55–57° | Pre. | 4 | 3 | 2 | 2 | 3 | 1 | 3 | 0 | 0 | 3 | 1 | 3 | -- | -- | 4 |
| | | | Post. | -- | -- | -- | -- | -- | -- | -- | -- | -- | -- | -- | -- | -- | -- | -- |

I claim:
1. Combating unwanted vegetation by applying to the locus of the vegetation an effective amount of a phenyl-1,3,4-oxadiazole having the structural formula

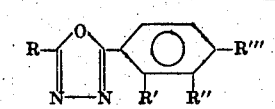

in which R is selected from the group consisting of hydrogen, mercapto, diethylamino, dimethylamino, methyl, ethyl and propyl, R' is selected from the group consisting of hydrogen, chloro and methyl,
R'' is selected from the group consisting of hydrogen, chloro, nitro, bromo and methyl,
R''' is selected from the group consisting of hydrogen, methyl, chloro and fluoro substituents.

2. Combating unwanted vegetation by applying pre-emergently to the locus of the vegetation an effective amount of 2-(3'-chlorophenyl)-1,3,4-oxadiazole.

3. Combating unwanted vegetation by applying pre-emergently to the locus of the vegetation an effective amount of 2-(3'-bromophenyl)-1,3,4-oxadiazole.

4. Combating unwanted vegetation by applying pre-emergently to the locus of the vegetation an effective amount of 2-(3'-chlorophenyl)-5-methyl-1,3,4-oxadiazole.

5. Combating unwanted vegetation by applying pre-emergently to the locus of the vegetation an effective amount of 2-(3'-chlorophenyl)-5-propyl-1,3,4-oxadiazole.

6. Combating unwanted vegetation by applying pre-emergently to the locus of the vegetation an effective amount of 2-(3'-bromophenyl)-5-methyl-1,3,4-oxadiazole.

7. Combating unwanted vegetation by applying pre-emergently to the locus of the vegetation an effective amount of 2-(3',4'-dichlorophenyl)-5-methyl-1,3,4-oxadiazole.

8. Combating crabgrass by applying pre-emergently to the locus of crabgrass seed an effective amount of 2-(3',4'-dichlorophenyl)-5-ethyl-1,3,4-oxadiazole.

9. Combating unwanted vegetation by applying pre-emergently to the locus of the vegetation an effective amount of 2-(3'4'-dichlorophenyl)-5-propyl-1,3,4-oxadiazole.

10. Combating unwanted vegetation by applying to the locus of the vegetation an effective amount of 2-diethylamino-5-p-tolyl-1,3,4-oxadiazole.

11. Combating unwanted vegetation by applying pre-emergently to the locus of the vegetation an effective amount of 2-(m-tolyl)-5-methyl-1,3,4-oxadiazole.

12. Combating unwanted vegetation by applying to the locus of the vegetation an effective amount of 2-diethylamino-5-(4'-fluorophenyl)-1,3,4-oxadiazole.

13. Combating unwanted vegetation by applying to the locus of the vegetation an effective amount of 2-dimethylamino-5-o-tolyl-1,3,4-oxadiazole.

14. Combating unwanted vegetation by applying post-emergently to the locus of the vegetation an effective amount of 2-diethylamino-5-phenyl-1,3,4-oxadiazole.

15. Combating unwanted vegetation by applying post-emergently to the locus of the vegetation an effective amount of 2-(3'-nitrophenyl)-5-mercapto-1,3,4-oxadiazole.

16. Combating unwanted vegetation by applying post-emergently to the locus of the vegetation an effective amount of 2-dimethylamino-5-(2',4'-dimethylphenyl)-1,3,4-oxadiazole.

17. Combating unwanted vegetation by applying to the locus of the vegetation an effective amount of 2-diethylamino-5-o-tolyl-1,3,4-oxadiazole hydrochloride.

18. Combating unwanted vegetation by applying to the locus of the vegetation an effective amount of 2-diethylamino-5-o-tolyl-1,3,4-oxadiazole.

19. Combating unwanted vegetation by applying to the locus of the vegetation an effective amount of 2-(2'-chlorophenyl)-5-dimethylamino-1,3,4-oxadiazole.

20. Combating unwanted vegetation by applying to the locus of the vegetation an effective amount of 2-(3',4'-dichlorophenyl)-1,3,4-oxadiazole.

21. Combating unwanted vegetation by applying to the locus of the vegetation an effective amount of 2-(4'-chlorophenyl)-5-diethylamino-1,3,4-oxadiazole.

22. Combating unwanted vegetation by applying to the locus of the vegetation an effective amount of 2-(4'-chlorophenyl)-5-diethylamino-1,3,4-oxadiazole hydrochloride.

23. Combating unwanted vegetation by applying to the locus of the vegetation an effective amount of 2-(3'-chloro-p-tolyl)-5-methyl-1,3,4-oxadiazole.

* * * * *